United States Patent
Iwanishi et al.

(10) Patent No.: US 6,988,254 B2
(45) Date of Patent: Jan. 17, 2006

(54) METHOD FOR DESIGNING SEMICONDUCTOR INTEGRATED CIRCUIT

(75) Inventors: Nobufusa Iwanishi, Hirakata (JP); Kazuhiro Satoh, Neyagawa (JP); Noriko Ishibashi, Mishima-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 341 days.

(21) Appl. No.: 10/601,287

(22) Filed: Jun. 20, 2003

(65) Prior Publication Data

US 2004/0049752 A1    Mar. 11, 2004

(30) Foreign Application Priority Data

Sep. 10, 2002 (JP) .............................. 2002-264627

(51) Int. Cl.
G06F 17/50 (2006.01)
(52) U.S. Cl. ................................ 716/6; 716/5; 716/10
(58) Field of Classification Search ................ 716/6, 716/5, 10
See application file for complete search history.

(56) References Cited

U.S. PATENT DOCUMENTS

| | | | |
|---|---|---|---|
| 6,028,993 A | 2/2000 | Yu et al. | |
| 6,090,150 A | 7/2000 | Tawada | |
| 6,099,580 A * | 8/2000 | Boyle et al. ................ | 716/7 |
| 6,216,256 B1 | 4/2001 | Inoue et al. | |
| 6,405,350 B1 | 6/2002 | Tawada | |
| 6,453,443 B1 * | 9/2002 | Chen et al. .................... | 716/1 |
| 6,799,310 B2 * | 9/2004 | Miyamoto .................... | 716/10 |
| 6,910,194 B2 * | 6/2005 | Mielke et al. ................. | 716/6 |
| 2003/0051222 A1 * | 3/2003 | Williams et al. .............. | 716/12 |
| 2004/0054975 A1 * | 3/2004 | Yee et al. ........................ | 716/6 |
| 2004/0054979 A1 * | 3/2004 | Bobba et al. ................. | 716/13 |
| 2004/0078767 A1 * | 4/2004 | Burks et al. ................... | 716/8 |

FOREIGN PATENT DOCUMENTS

JP    2002-73714    3/2002

* cited by examiner

Primary Examiner—Matthew Smith
Assistant Examiner—Magid Y. Dimyan
(74) Attorney, Agent, or Firm—Hamre, Schumann, Mueller & Larson, P.C.

(57) ABSTRACT

A method for designing a semiconductor integrated circuit is provided that is capable of a timing simulation that is approximate to an actual operation by reducing the effect of IR drop on the timing without reducing an effective area necessary for arrangement of elements or the number of pads that can be used other than power supply pads and without increasing the processing time. In a FF driving ability change procedure, a flip-flop having a delay time larger than a transition time from a state in which an IR drop occurs in a power supply voltage to a state of an ideal power supply voltage is substituted for an arbitrary flip-flop. Thus, a delay library considering IR drop may be produced previously only for the flop-flop, thus enabling a production time of the library to be reduced and improving the calculation accuracy of the delay time in the delay calculation procedure. Furthermore, the substitution of a flip-flop having a low driving ability enables the area to be reduced.

3 Claims, 23 Drawing Sheets

(1) PATH
    Start Point      : Flip-flop 0200/Q
    End Point        : Flip-flop 0204/D
    Through Point    : —
(2) slack
    Value            : Slack
(3) FF info
    Start FF  type   : x10
    Start FF  delay  : 1.0(ns)
    cell1 type       : x2
    cell1 delay      : 0.5(ns)
    cell2 type       : x3
    cell2 delay      : 0.43(ns)
    wire1 delay      : 0.1(ns)
    wire2 delay      : 0.05(ns)
    End FF setup     : 0.3(ns)

METHOD FOR DESIGNING SEMICONDUCTOR INTEGRATED CIRCUIT

BACKGROUND OF THE INVENTION

1. Field of the Invention

The present invention relates to a method for designing a semiconductor integrated circuit. In particular, it relates to a technology for controlling a timing with respect to a voltage drop (referred to as an IR drop hereinafter) caused by a resistance component of a power supply wiring in a semiconductor integrated circuit, and a method for designing a circuit in which the effect of an IR drop is reduced.

2. Description of the Related Art

Recently, as the size of LSI has been increased and lower electric power has been demanded, various kinds of physical phenomena have become significant. Therefore, unless such physical phenomena are taken into consideration at the designing stage, a phenomenon occurs in which a semiconductor integrated circuit operates in simulation but does not operate as an actual product. In particular, a phenomenon referred to as an IR drop, caused by a resistance component of a power supply wiring, hardly was considered a problem in the era of the 0.25 μm rule in which a power supply voltage was high. However, as the structure has become increasingly finer, the power supply voltage has been lowering to 1.8V, to 1.5V and to 1.0V. Such an IR drop has not been negligible.

FIG. 11A is an equi-voltage view schematically showing a distribution of an amount of IR drop in an LSI. In FIG. 11A, since a power supply pad (not shown) is placed on the outer circumferential part of the LSI, a region 1101 in the center part of the LSI is distant from the power supply pad, so that the amount of IR drop is larger. On the contrary, in a region 1100 near the power supply pad, the amount of the IR drop is smaller.

Furthermore, an IR drop occurs significantly in a synchronous design. This is because, in the synchronous design, all flip-flops operate simultaneously in synchronization with a clock signal, and a large amount of electric current flows into a power supply wiring for providing these flip-flops with an electric power, thus causing an IR drop.

FIG. 11B is a graph showing the relationship between a cycle time and an amount of IR drop. As shown in FIG. 11B, the amount of IR drop becomes large at the rising edge of a clock signal CK and then a power supply voltage approaches an ideal power supply voltage with the passage of time.

Next, the effect of the occurrence of an IR drop will be explained.

When an IR drop occurs, since an amount of power supplied to cells constituting an LSI is reduced, the operations of the cells become slow and thus a timing change occurs. However, the present timing design is performed assuming that the power supply is an ideal power supply, that is, an IR drop does not occur. Therefore, when the timing change occurs due to this IR drop, a timing error may occur in an LSI when it is used as an actual product although it had no timing problem at the verification stage.

Conventionally, the power supply wiring is designed so as to prevent the occurrence of an IR drop. Specifically, attempts for avoiding an IR drop have been performed by increasing the number of power supply pads 1200 so as to increase the number of the power supply wirings as shown in FIG. 12A, or by employing a mesh wiring so as to increase an amount of the power supply to the center portion of an LSI as shown in FIG. 12B.

There was another method in which, assuming that an IR drop occurs inevitably, a timing change due to the IR drop was taken into a delay library used for calculating the timing. The timing design is performed by using the delay library at the time of designing. There were two kinds of approaches with this idea.

The first approach is a method including, after performing a layout, analyzing an IR drop, calculating a delay based on the amount of the IR drop and verifying the timing. FIG. 13 is a flowchart showing this designing method.

In a layout procedure S1300, a layout is performed without considering IR drop and a layout 1300 is output. Next, in an IR drop analyzing procedure S1301, for all cells constituting the LSI, an amount of IR drop 1301 is calculated from the layout 1300. Next, in a delay calculation procedure S1302, a delay calculation is performed by using a delay library 1302 considering IR drop characterized at various power supply voltages and the amount of IR drop 1301 for each cell. Herein, since it is not known how much IR drop occurs when the delay library 1302 considering IR drop is produced, it is necessary to characterize the delay with many kinds of power supply voltages. Next, in a timing verification procedure S1303, the timing verification is performed by using a delay information 1303 considering IR drop and it is determined whether or not the timing is in time.

Furthermore, there is another method including predetermining an amount of IR drop of LSI, performing a layout so that the IR drop reaches the predetermined IR drop, calculating a delay and verifying a timing. In this method, for example, 50 mV of IR drop is predetermined to occur and a layout is performed so that the IR drop becomes 50 mV. FIG. 14 is a flowchart showing this designing method.

In a layout procedure S1400 considering IR drop, a layout 1400 considering IR drop is generated so that an amount of IR drop becomes the predetermined amount. Next, in a delay calculation procedure S1401, a delay calculation is performed from a delay library 1401 considering IR drop characterized by the predetermined amount of IR drop and the layout 1400 considering IR drop, the delay information 1303 is output and then a timing verification is performed in the timing verification procedure S1303.

The above-mentioned conventional designing methods have such problems as mentioned below.

Firstly, in the design of the power supply wiring in which the number of the power supply wirings or power supply pads are increased so as to suppress the amount of IR drop, there are problems that: it is necessary to increase the number of the power supply wirings, thus reducing the effective area necessary for arrangement of elements; or the number of power supply pads is increased, thus reducing the number of pads that can be used for other than the power supply pads.

Furthermore, in the designing method shown in FIG. 13 in which the IR drop is analyzed and the delay is calculated with the amount of IR drop, at the time of producing the delay library 1302 considering IR drop, characterization at possible various power supply voltages is required for all cells and thus the time for producing the delay library becomes enormous.

Furthermore, in the designing method shown in FIG. 14 in which the layout is generated after the amount of IR drop is predetermined, it is difficult to have all cells operate with the same amount of IR drop.

SUMMARY OF THE INVENTION

With the foregoing in mind, it is an object of the present invention to provide a method for designing a semiconductor integrated circuit capable of a timing simulation that is approximate to an actual operation by reducing the effect of IR drop on the timing or the amount of IR drop itself without reducing an effective area necessary for arrangement of elements and the number of pads that can be used other than power supply pads and without increasing the processing time.

In order to achieve the above-mentioned object, a first method for designing a semiconductor integrated circuit including basic elements and wirings connecting the basic elements includes: a first timing verification procedure for verifying the timing between flip-flops by adding delay times of the basic elements and the wirings; a slack sort procedure for extracting flip-flops at the starting point and the end point of a path, a delay time and a set-up time of cells constituting the path, and a slack with respect to a cycle time from a timing report output by the first timing verification procedure; a flip-flop driving ability change procedure for substituting a flip-flop having a delay time larger than a transition time from a state in which a power supply voltage drops due to a resistance component of a power supply wiring to a state of an ideal power supply for an arbitrary flip-flop; a layout modification procedure for allowing a netlist modified by the substitution to be reflected on the layout; a delay calculation procedure for calculating a delay from a delay library of only the flip-flops taking a voltage drop into consideration and a delay library produced in a state of an ideal power supply voltage; and a second timing verification procedure for verifying the timing using delay information output from the delay calculation procedure.

In order to achieve the above-mentioned object, a second method for designing a semiconductor integrated circuit including basic elements and wirings connecting between the basic elements includes: a first timing verification procedure for verifying the timing between flip-flops by adding delay times of the basic elements and the wirings; a slack sort procedure for extracting flip-flops at the starting point and the end point of a path, and a slack with respect to a cycle time of the path from a timing report output by the first timing verification procedure; a positive/negative flip-flop change procedure for substituting a flip-flop operating at the trailing edge of the clock signal for a flip-flop operating at the rising edge of the clock signal at the end point of the path whose slack is larger than ½ of the cycle time so as to make more uniform an amount of a voltage drop of the power supply voltage due to a resistance component of the power supply wiring; a layout modification procedure for allowing a netlist modified by the substitution to be reflected on the layout, a delay calculation procedure for calculating a delay from a delay library corresponding to the more uniform amount of the voltage drop, and a second timing verification procedure for verifying the timing using delay information output from the delay calculation procedure.

In order to achieve the above-mentioned object, a third method for designing a semiconductor integrated circuit including basic elements and wirings connecting between the basic elements includes: a first timing verification procedure for verifying the timing between flip-flops by adding delay times of the basic elements and the wirings; a slack sort procedure for extracting flip-flops at the starting point and the end point of a path and a slack with respect to a cycle time of the path from a timing report output by the first timing verification procedure; a flip-flop substitution procedure for substituting a buffer having a delay time that is the same as the total time of a set-up time, a delay time of a flip-flop and the slack at the end of the path whose slack is approximate to zero; a layout modification procedure for allowing a netlist modified by the substitution to be reflected on the layout; a delay calculation procedure for calculating a delay from a delay library produced in a state of an ideal power supply voltage; and a second timing verification procedure for verifying the timing using delay information output from the delay calculation procedure.

BRIEF DESCRIPTION OF THE DRAWINGS

FIG. 3 is a view showing an example of the content of a slack list 0101 shown in FIG. 1.

DESCRIPTION OF THE PREFERRED EMBODIMENTS

Hereinafter, embodiments of the present invention will be explained with reference to drawings.

(First Embodiment)

Figure 1:
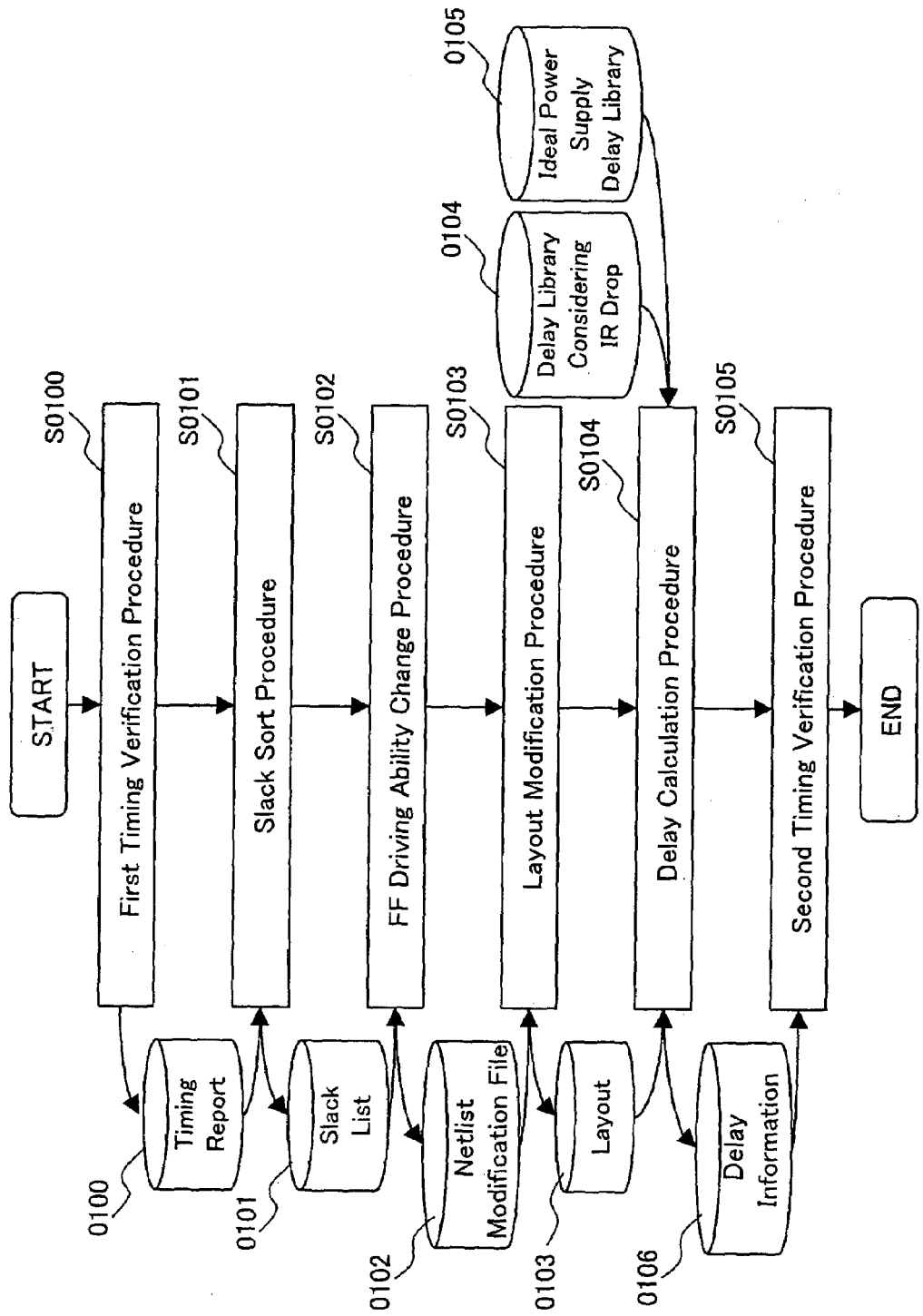
FIG. 1 is a flowchart showing a process procedure in a method for designing a semiconductor integrated circuit according to a first embodiment of the present invention.

FIG. 1 is a flowchart showing a method for designing a semiconductor integrated circuit according to a first embodiment of the present invention. In FIG. 1, firstly, in a first timing verification procedure S0100, a netlist, delay information and restriction are input, the timing is verified, and a timing report 0100 of all the paths between flip-flops is output. Herein, the netlist is, for example, a verilog netlist, the delay information is an SDF (Standard Delay Format) and the restriction is a timing restriction file describing the definition of a clock, the designation of a false path and a multicycle path, etc. Furthermore, in the output timing report 0100, a delay time of each cell, a wiring delay time and a slack from a flip-flop at the starting point to a flip-flop at the ending point are described. This timing report 0100 may be such information as can be output easily by any commercial static timing verification tools.

Figure 2A:
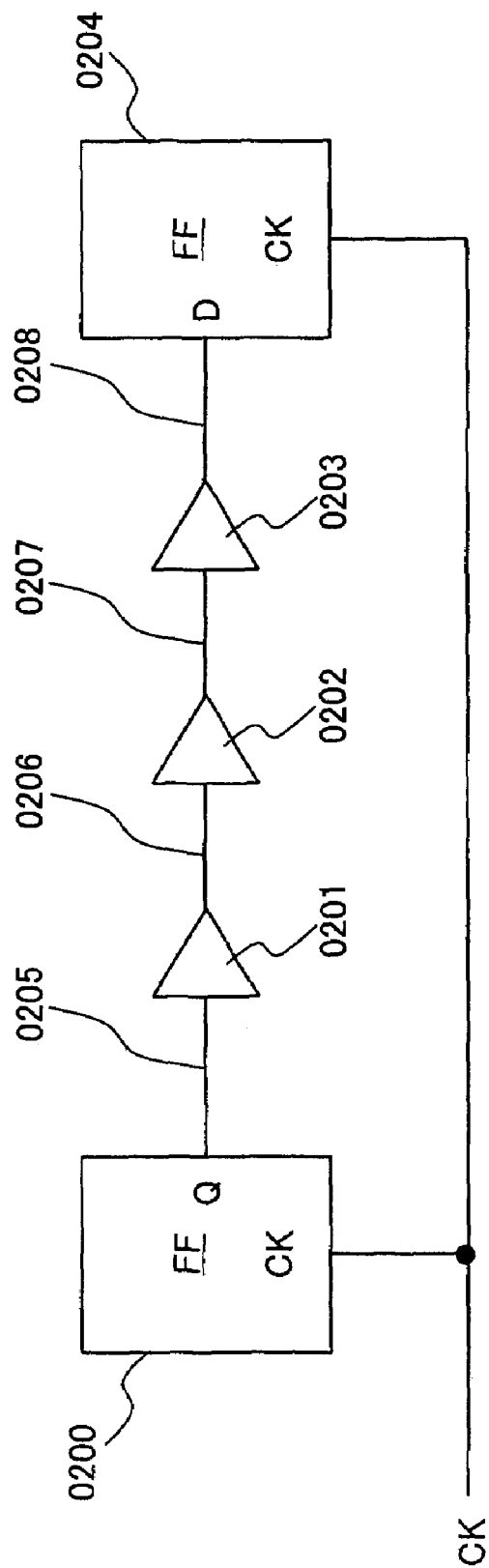
FIG. 2A is a circuit diagram showing a configuration of a circuit before executing a flip-flop (FF) driving ability change procedure S0102 shown in FIG. 1.
Figure 2B:
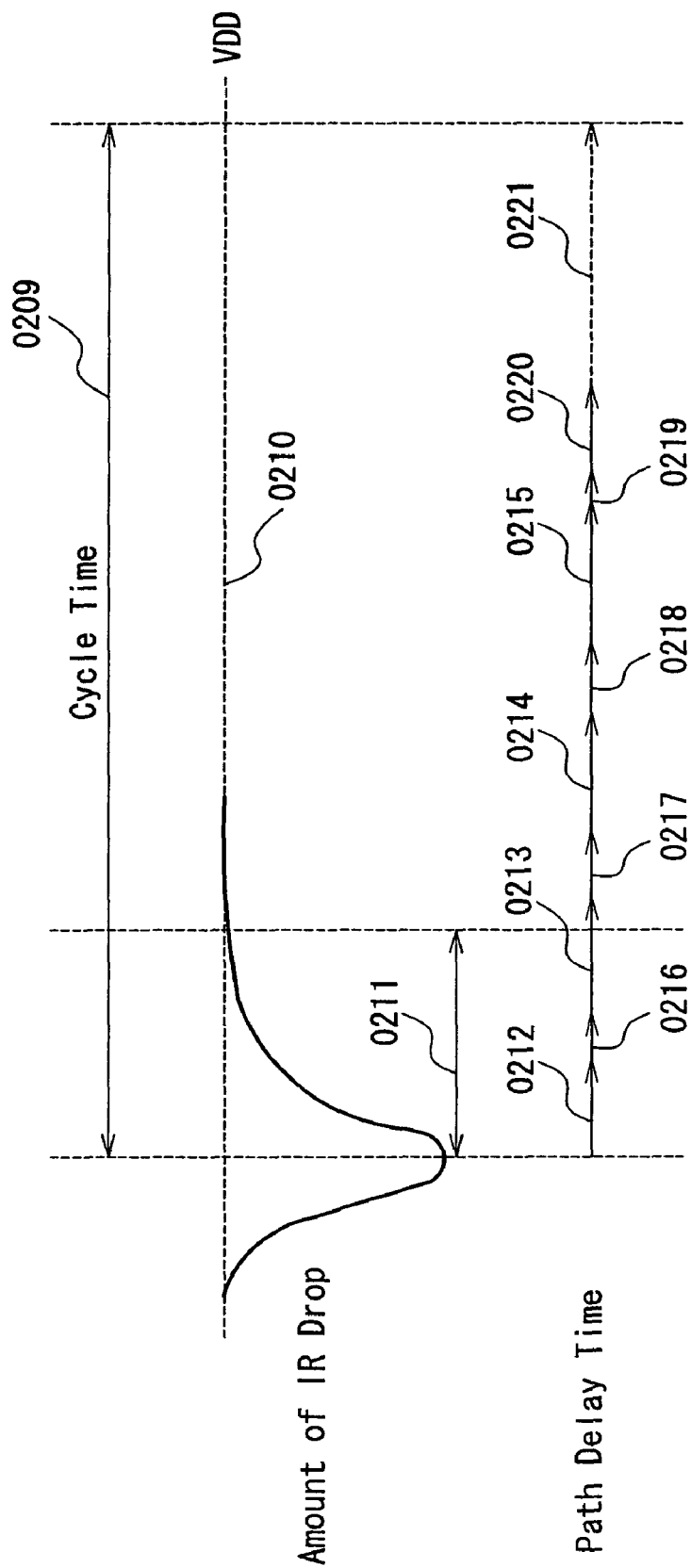
FIG. 2B is a graph showing an amount of IR drop and a path delay time of each element with respect to a cycle time in the configuration of the circuit shown in FIG. 2A.

For example, as shown in FIG. 2A, a circuit in which a flip-flop (FF) 0200 is connected to a flip-flop (FF) 0204 via a wiring 0205, a cell 0201, a wiring 0206, a cell 0202, a wiring 0207, a cell 0203 and a wiring 0208, which are connected in this order, will be explained. As shown in FIG. 2B, when the delay times corresponding to elements shown in FIG. 2A are delay times 0212, 0216, 0213, 0217, 0214, 0218, 0215 and 0219, respectively, all these delay times and a set-up time 0220 of the flip-flop 0204 are added, and a timing report 0100 (FIG. 1) is generated as a delay time of the path from the flip-flop 0200 to the flip-flop 0204. Furthermore, with respect to the cycle time 0209, as a margin of the delay time of the above-mentioned path, a slack 0221 is calculated. If a slack 0221 is a positive value, the timing is in time; and if it is a negative value, the timing is not in time.

In this case, an amount of IR drop 0210 with respect to the cycle time 0209 is shown in FIG. 2B.

Since all the flip-flops operate at the moment a clock signal CK enters the flip-flop of the clock synchronization, the amount of IR drop 0210 changes by the largest amount when the clock signal CK is input and it recovers to a state of an ideal power supply voltage with the passage of time. In FIG. 2B, during transition time 0211 from the time IR drop occurs to the time the power supply voltage reaches an ideal state, the flip-flop 0200 (delay time 0212), the wiring 0205 (delay time 0216) and the cell 0201 (delay time 0213) operate.

Returning to FIG. 1, next, in a slack sort procedure S0101, only necessary information is obtained from the timing report 0100 output by the first timing verification procedure S0100 and it is output as a slack list 0101. FIG. 3 shows an example of the content of the slack list 0101. The meanings of terms used in FIG. 3 are mentioned below.

Start Point: names of a flip-flop and a terminal at the starting point

End Point: names of a flip-flop and a terminal at the end point

Through Point: names of a flip-flop and a terminal at the middle point.

Value: slack of path

Start FF type: driving ability of a flip-flop at the starting point

Start FF delay: delay time of a flip-flop at the starting point cell x type: driving ability of cells constituting a path (x denotes a unique natural number provided for each cell)

cell x delay: delay time of cells constituting a path wire x delay: delay time of wirings constituting a path (x denotes a unique natural number for each wiring)

End FF setup: Set-up time of a flip-flop at the end point

Figure 4A:
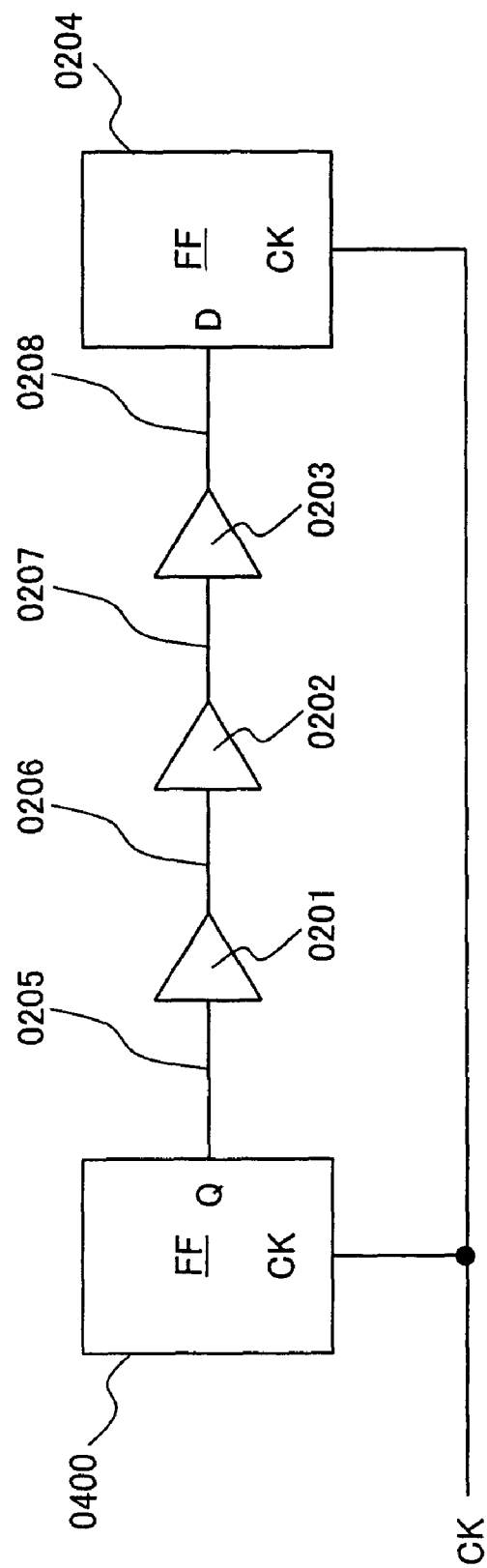
FIG. 4A is a circuit diagram showing a configuration of a circuit after executing a FF driving ability change procedure S0102 shown in FIG. 1.

Next, in the FF driving ability change procedure S0102, by substituting a flip-flop having a low driving ability (that is, having a large delay time) for the flip-flop 0200 for driving a path (see FIG. 2A), the netlist is changed and output as a netlist modification file 0102. In the procedure for substituting flip-flops, specifically, as shown in FIG. 4, a flip-flop 0400 having a delay time 0401 that is larger than the delay time 0212 (see FIG. 4A) is substituted for the flip-flop 0200 of the delay time 0212 as shown in FIG. 2A. At this time, the delay time 0401 of the flip-flop 0400 and the delay time 0212 of the flip-flop 0200 satisfy the following relationship (1).

$$\text{Delay time } 0401 > \text{Delay time } 0212 \qquad (1)$$

Figure 4B:
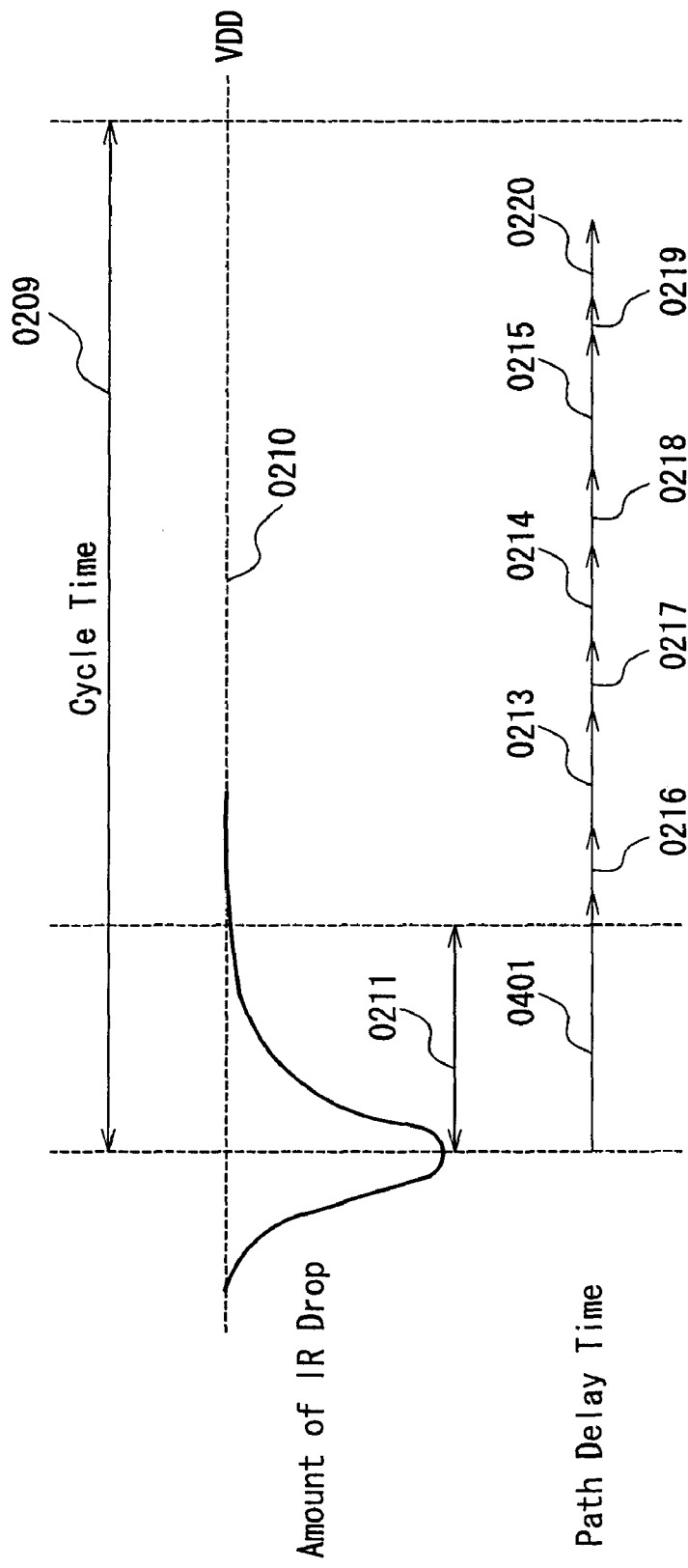
FIG. 4B is a graph showing an amount of IR drop and a path delay time of each element with respect to a cycle time in the configuration of the circuit shown in FIG. 4A.

As a result of the increase in the delay time due to this substitution of flip-flops, only the flip-flop 0400 operates in a state in which IR drop occurs (during the transition time 0211) and the following cells operate with the ideal power supply as shown in FIG. 4B.

Next, in a layout modification procedure S0103, in accordance with a netlist modification file 0102, a layout is modified and output as a layout 0103. In this modification, since the flip-flop is changed into a flip-flop having a low driving ability, the area of the flip-flop itself is surely reduced, and thus the modification can be performed without increasing the area of the entire LSI and without the change of the position of wirings.

Next, in a delay calculation procedure S0104, resistance and capacitance components are extracted from the modified layout 0103, then a delay calculation is performed by reading a delay library 0104 considering IR drop and an ideal power supply delay library 0105, and a delay information 0106 is output. Herein, in a delay library 0104 considering IR drop, only a flop-flop is described as a cell type. Furthermore, in the ideal power supply delay library 0105, information about all cell types except the flop-flop is described. In the FF driving ability change procedure S0102, since only the flip-flop operates in a state in which IR drop occurs, a delay library considering the effect of IR drop may be produced for only the flip-flop. On the contrary, since all the cells except the flip-flop operate only under the ideal power supply, a delay library produced in a state of the ideal power supply may be employed.

Finally, in the second timing verification procedure S0105, it is confirmed whether or not a new timing error occurs due to the substitution for flip-flops. If a timing error occurs in the second timing verification procedure S0105, by adjusting the delay time of cells except the flip-flop, a timing convergence is performed.

As mentioned above, the delay time of the flip-flop is increased so that only the flip-flop operates in a time period in which IR drop occurs. In the case where cells other than the flip-flop operate when the IR drop occurs (the case of FIG. 2A and FIG. 2B), it is necessary that the delay library considering IR drop is produced for all the cells and timing verification is performed. However, according to this embodiment, a delay library considering IR drop limited only for the flip-flop may be produced, thus reducing the library production time.

Furthermore, since the delay calculation accuracy of the flip-flop is improved by using the delay library 0104 considering IR drop, and the delay calculation of the other cells can be calculated by using an ideal power supply delay library 0105 with high accuracy, the timing simulation that is closer to the actual product can be performed.

Furthermore, since in the substitution of flip-flops in this embodiment, the area of a single flip-flop becomes smaller as the driving ability becomes lower, the effective area necessary for the arrangement of elements is not reduced. Furthermore, there are advantages that since all the delay times of the flip-flops are increased, a hold error is not likely to occur.

(Second Embodiment)

Figure 5:
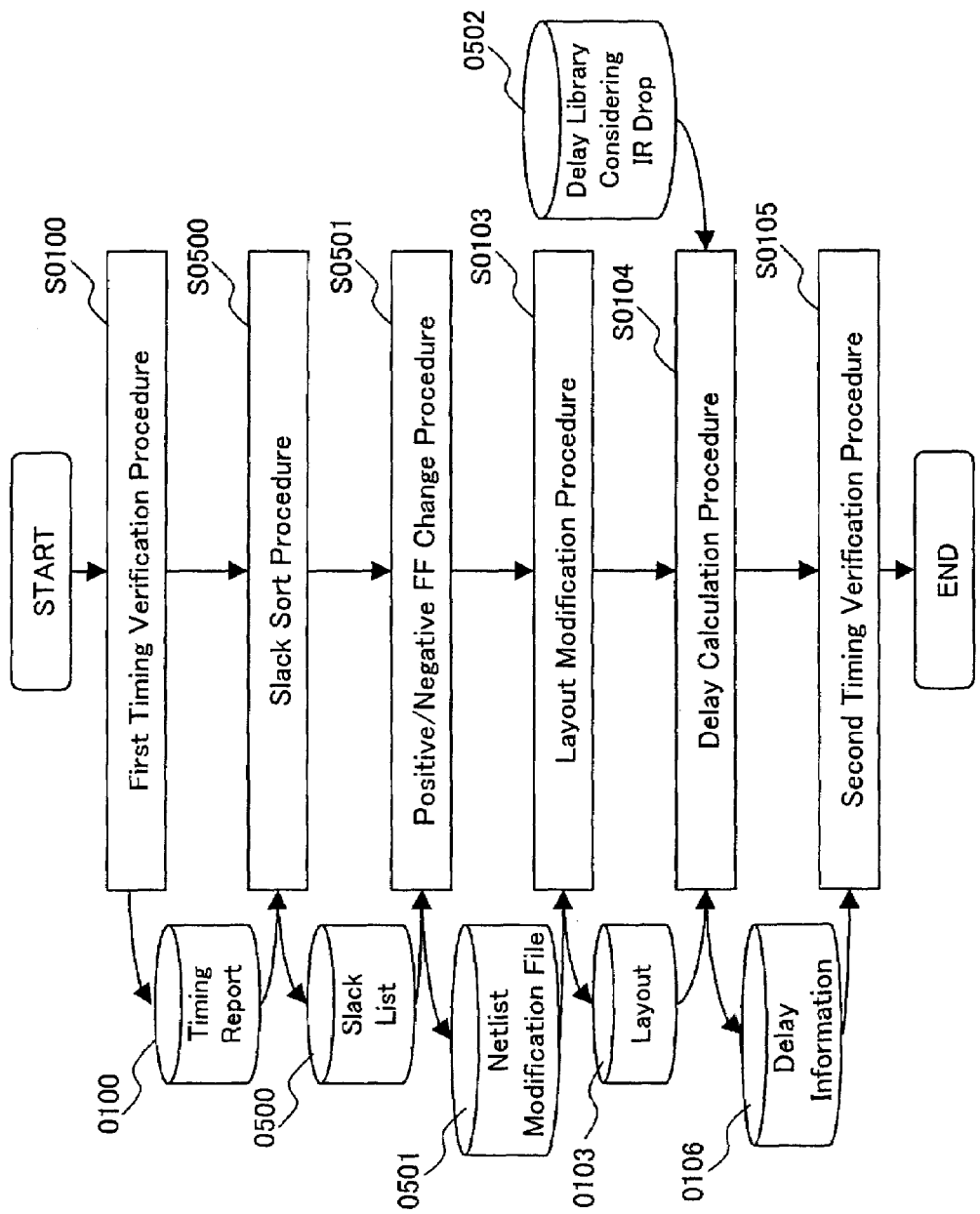
FIG. 5 is a flowchart showing a process procedure in a method for designing a semiconductor integrated circuit according to a second embodiment of the present invention.

FIG. 5 is a flowchart showing a method for designing a semiconductor integrated circuit according to a second embodiment of the present invention. Note here that in FIG. 5, the same numbers are given to the same parts as those in the configuration of the first embodiment shown in FIG. 1.

The second embodiment is different from the first embodiment in that a slack sort procedure S0500, a positive/negative FF change procedure S0501 for changing a flip-flop operating at the rising edge of the clock signal into the flip-flop operating at the trailing edge thereof, a slack list 0500, a netlist modification file 0501 and a delay library S0502 considering IR drop are substituted respectively for the slack sort procedure S0101, the FF driving ability change procedure S0102, the slack list 0101, the netlist modification file 0102 and the delay library 0104 considering IR drop. Also, the ideal power supply delay library 0105 is deleted.

In FIG. 5, in the slack sort procedure S0500, information is extracted from the timing report 0100 generated in the first timing verification procedure S0100 and it is output as a slack list 0500. Herein, FIG. 6C shows an example of the content of the slack list 0500. The meanings of the terms used in FIG. 6C are mentioned below.

Start Point: names of a flip-flop and a terminal at the starting point

End Point: names of a flip-flop and a terminal at the end point

Through Point: names of a flip-flop and a terminal at the middle point

Value: slack of path

Figure 6A:
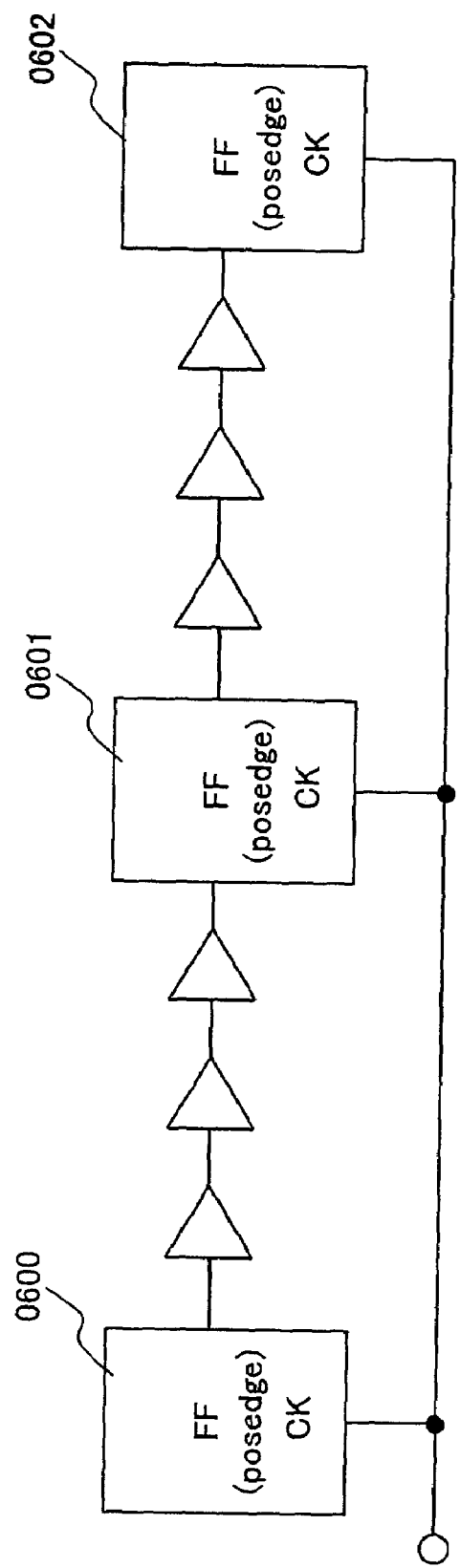
FIG. 6A is a circuit diagram showing a configuration of a circuit before executing a positive/negative FF change procedure S0501 shown in FIG. 5.
Figure 6B:
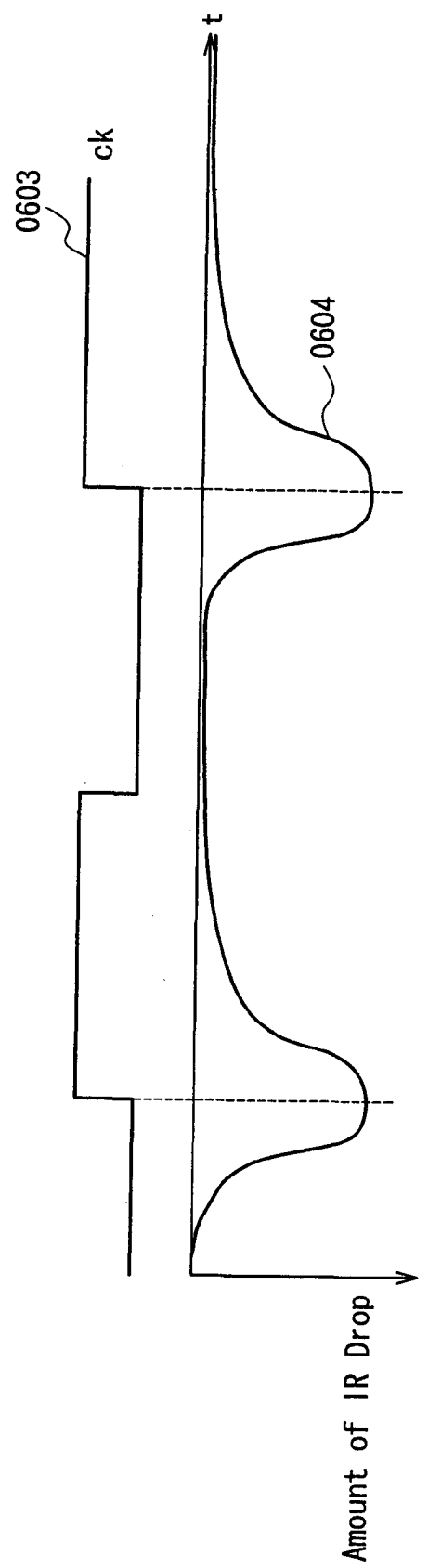
FIG. 6B is a graph showing an amount of IR drop with respect to a clock signal CK in the configuration of the circuit shown in FIG. 6A.
Figure 6C:
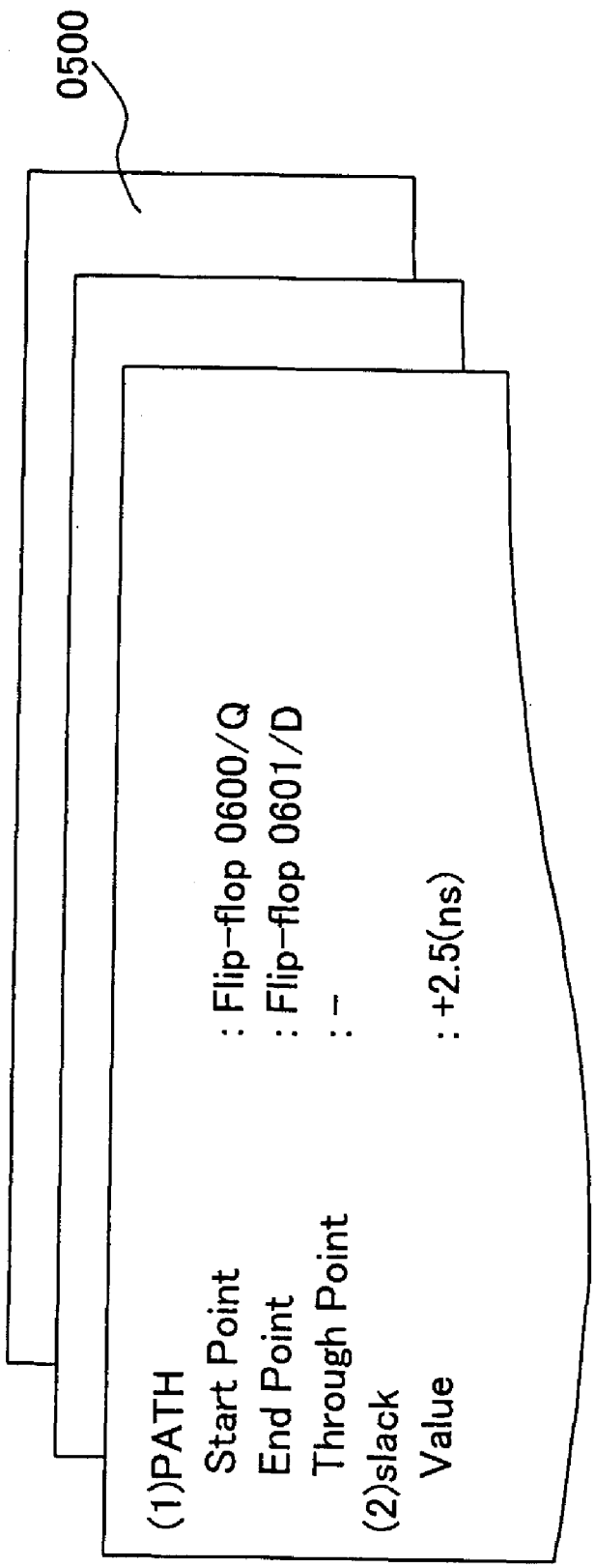
FIG. 6C is a view showing an example of the content of a slack list 0500 shown in FIG. 5.

As shown in FIG. 6A, the case where there are a path from a flip-flop 0600 to a flip-flop 0601 and a path from a flip-flop 0601 to a flip-flop 0602 will be explained. In FIG. 6A, all of the flip-flops 0600, 0601 and 0602 are flip-flops operating at the rising edge of the clock signal (CK) 0603 (FIG. 6B) and will be referred to as a positive flip-flop (FF (posedge), hereinafter). In the case of such a configuration, an amount of IR drop 0604 with respect to the clock signal CK is shown in FIG. 6B. In the case where a circuit is configured by only positive flip-flops, all the flip-flops operate at the rising edge of the clock signal CK, and thereby the amount of IR drop is at a maximum.

Figure 7A:
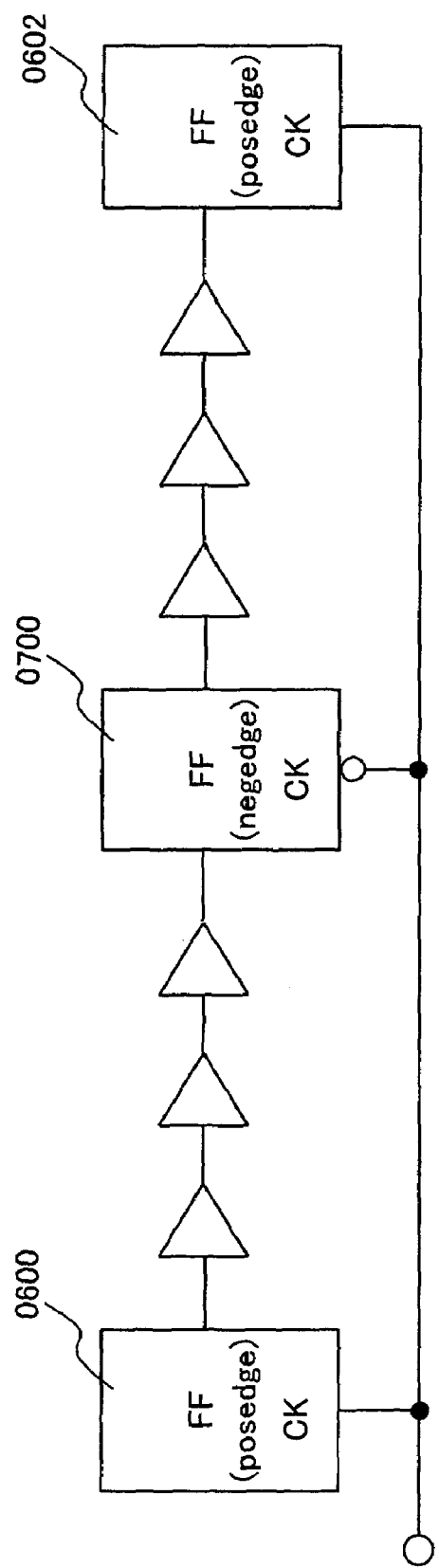
FIG. 7A is a circuit diagram showing a configuration of a circuit after executing a positive/negative FF change procedure S0501 shown in FIG. 5.

Next, in the positive/negative FF change procedure S0501, a path whose slack is larger than ½ of the clock cycle is extracted from the slack list 0500, as shown in FIG. 7A, a flip-flop 0700 operating at the trailing edge of the clock signal CK (which will be referred to as a negative flip-flop (FF (negedge)), hereinafter) is substituted for the flip-flop positioned at the end point of the path and a netlist modification file 0501 is output. For all the paths, the positive/negative FF change procedure S0501 is executed and all that can be changed from the positive flip-flop to the negative flip-flop are substituted. However, at the time the number of the positive flip-flops becomes the same as the number of the negative flip-flops, the substitution procedure is stopped.

Next, in the layout modification procedure S0103, in accordance with the netlist modification file 0501, the layout is modified and output as a layout 0103.

Figure 7B:
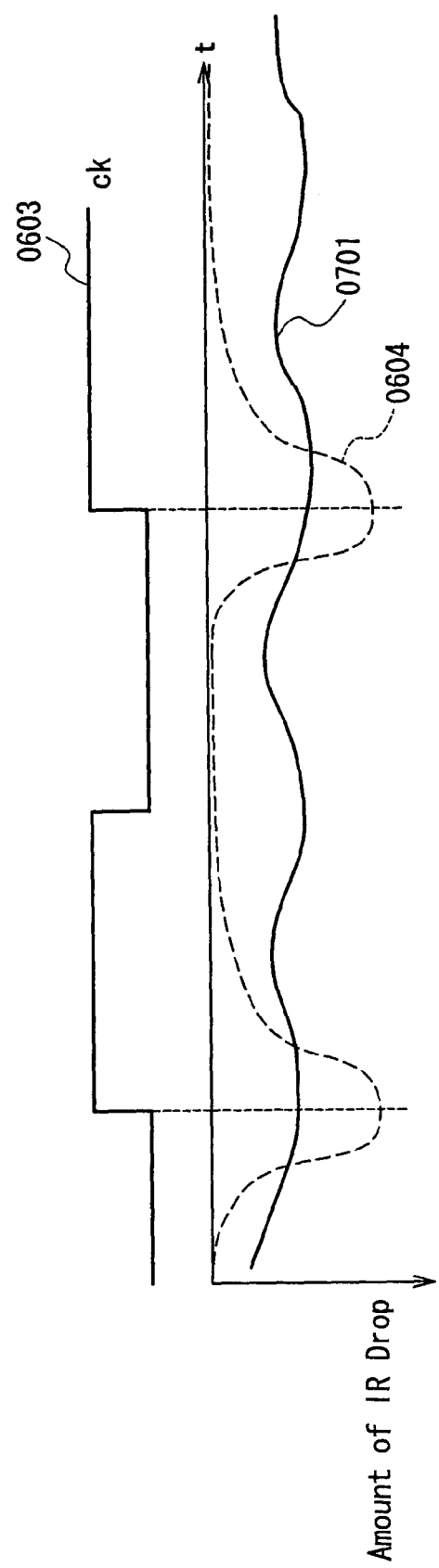
FIG. 7B is a graph showing an amount of IR drop with respect to a clock signal CK in the configuration of the circuit shown in FIG. 7A.

Next, in the delay calculation procedure S0104, resistance and capacitance components are extracted from the modified layout and then the delay library 0502 considering IR drop is read, the delay calculation is performed and delay information 0106 is output. In the delay library 0502 considering IR drop, information necessary for the delay calculation for cells including flip-flops is described. In the positive/negative FF change procedure S0501, the flip-flop operating at the trailing edge of the clock signal CK is substituted for the flip-flop operating at the rising edge thereof, and thereby an amount of IR drop 0701 is made more uniform with respect to the clock signal CK, as shown in FIG. 7B (for comparison, the amount of IR drop 0604 before the substitution is shown by a broken line). In this case, all the cells including flip-flops operate in a state in which the amount of IR drop with the same level occurs. Therefore, the delay library 0502 considering IR drop is produced in advance assuming that the same amount of IR drop occurs in all the cells.

Finally, in the second timing verification procedure S0105, it is confirmed whether or not a new timing error occurs due to the substitution for flip-flops. At this time, for the path from the flip-flop 0600 to the flip-flop 0700, the timing check is executed for half the cycle time and for the path from the flip-flop 0700 to the flip-flop 0602, the timing check is executed for 1.5 times the cycle time. As a concrete numeric example, for example, if the cycle time is 10 ns, the former path is checked for 5 ns and the latter path is checked for 15 ns. These two paths are checked for 20 ns in total without the change before and after the substitution of flip-flops.

As mentioned above, according to this embodiment, by changing a positive flip-flop into a negative flip-flop, as shown in FIG. 7B, an IR drop occurs also at the trailing edge of the clock signal. By making the number of the positive flip-flops and the number of the negative flip-flops to be approximately the same number, the change in the amount of IR drop over time from the rising edge of the clock signal to the trailing edge of the clock signal is reduced. As a result, at the time of production of the delay library used for calculating the delay time for timing verification, if a certain amount of IR drop is taken into consideration with respect to all the cells, the delay calculation can be performed precisely, thus performing a simulation of an operation that is closer to an actual operation.

Furthermore, in the case where there is an amount of IR drop as shown in FIG. 6B, since the amount of IR drop is different from one cell to another, it was necessary that the different amount of IR drop be calculated for each cell, and a delay calculation was performed using the calculated amount. However, according to the present embodiment, since the change of the amount of IR drop over time is reduced, by only selecting any one of cells to calculate the amount of IR drop, the calculated amount of IR drop can be applied to all the cells, which leads to the reduction of the processing time.

(Third Embodiment)

Figure 8:
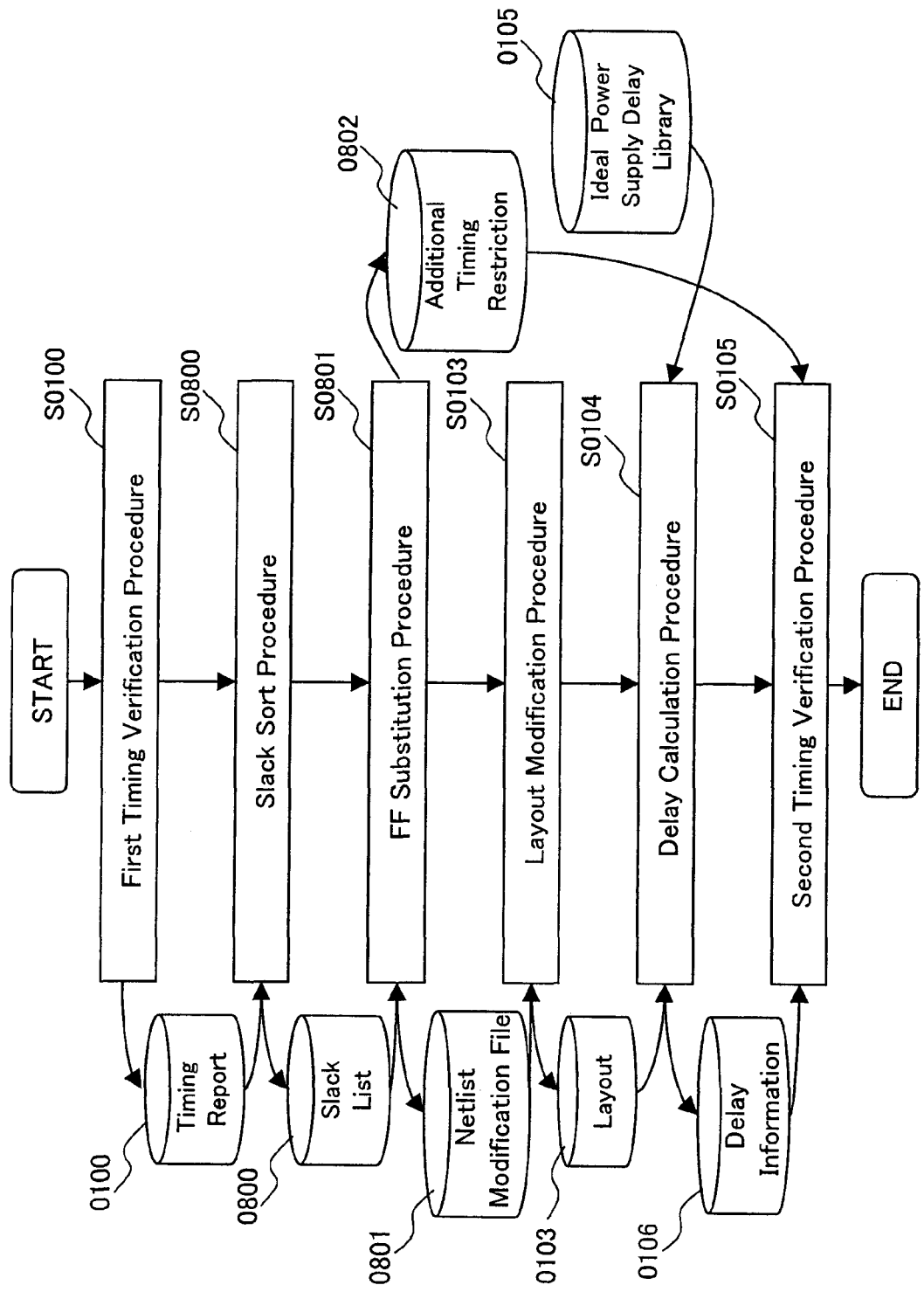
FIG. 8 is a flowchart showing a process procedure in a method for designing a semiconductor integrated circuit according to a third embodiment of the present invention.

FIG. 8 is a flowchart showing a method for designing a semiconductor integrated circuit according to a third embodiment of the present invention. Note here that in FIG. 8, the same numbers are given to the same parts as those in the configuration of the first embodiment shown in FIG. 1.

The third embodiment is different from the first embodiment in that a slack sort procedure S0801, a FF substitution procedure S0801 substituting a buffer for a flip-flop, a slack list 0800, a netlist modification file 0801 and a delay library 0502 considering IR drop are substituted respectively for the slack sort procedure S0101, the FF driving ability change procedure S0102, the slack list 0101 and the netlist modification file 0102. Also, the delay library 0104 considering IR drop and the ideal power supply delay library 0105 are deleted and an additional timing restriction 0802 is added as a result of substituting the buffer for the flip-flop.

In FIG. 8, in the slack sort procedure S0800, information is extracted from the timing report 0100 generated at the first timing verification procedure S0100, and output as a slack list 0800. Herein, FIG. 9C shows an example of the content of the slack list 0800. The meanings of the terms used in FIG. 9C are mentioned below.

Figure 9A:
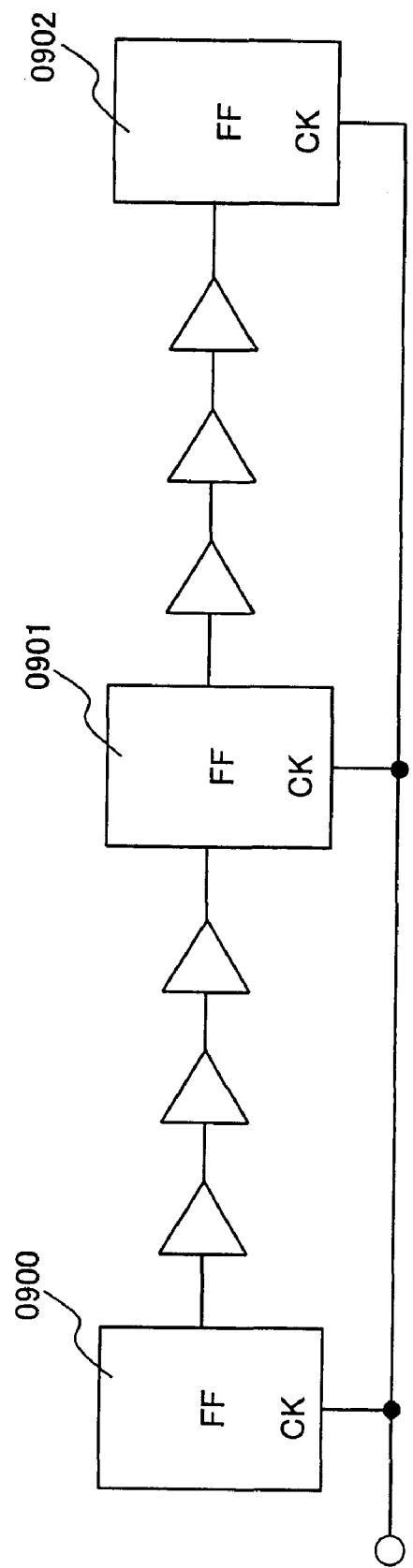
FIG. 9A is a circuit diagram showing a configuration of a circuit before executing a FF substitution procedure S0801 shown in FIG. 8.
Figure 9B:
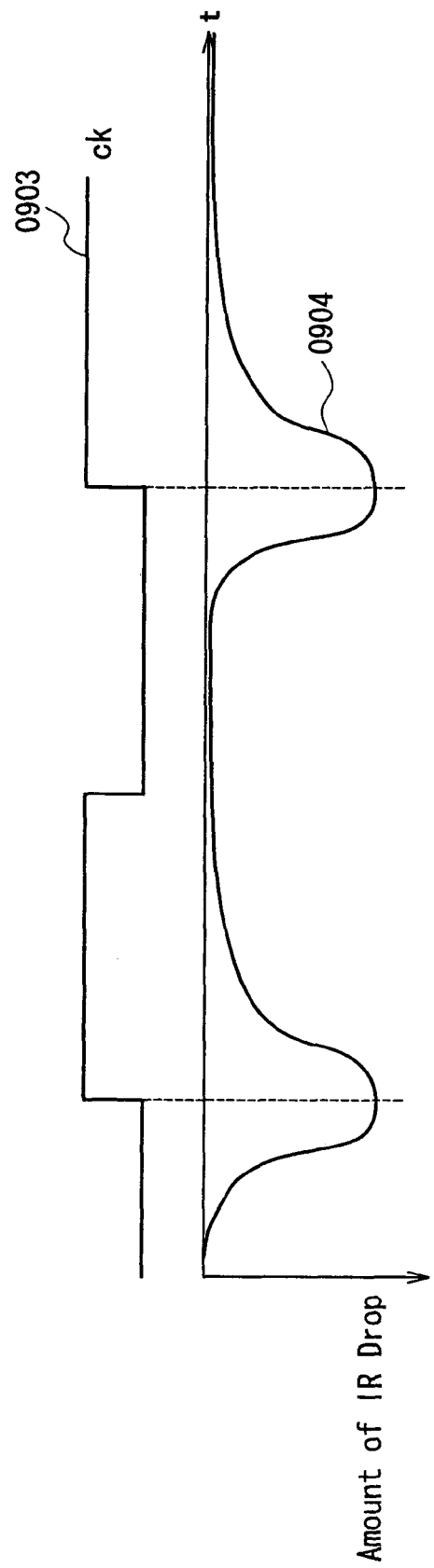
FIG. 9B is a graph showing an amount of IR drop with respect to a clock signal CK in the configuration of the circuit shown in FIG. 9A.
Figure 9C:
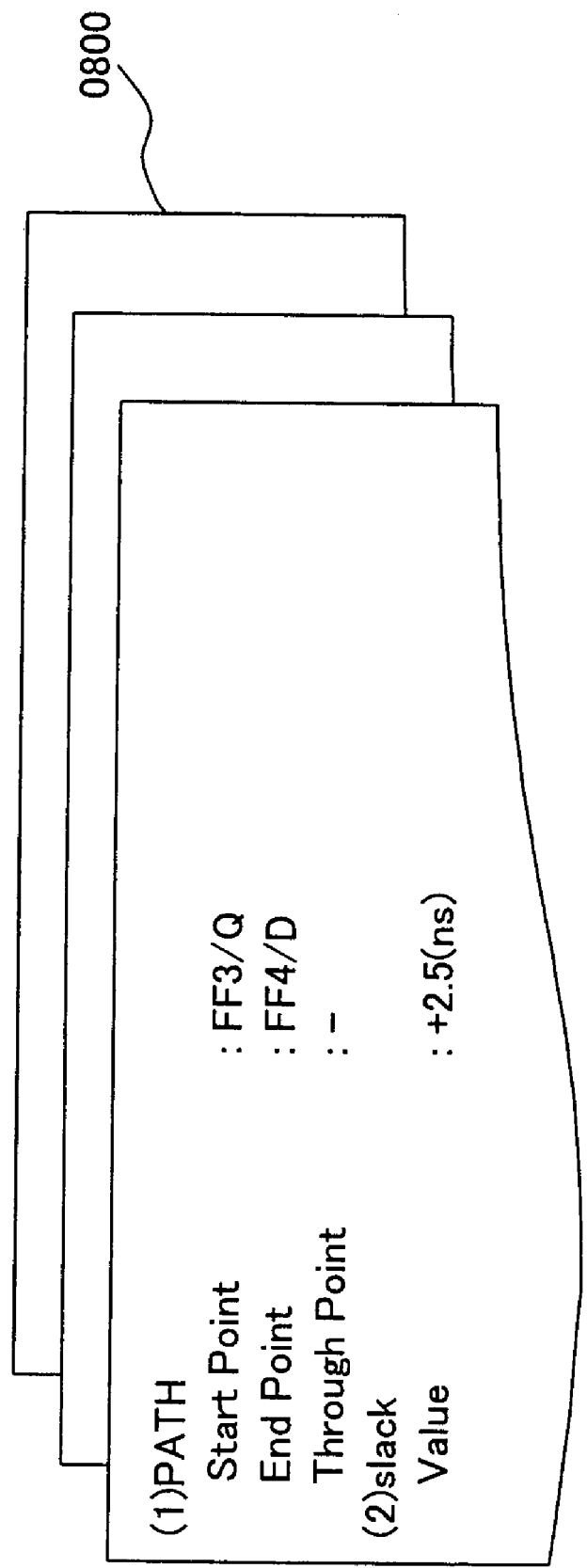
FIG. 9C is a view showing an example of the content of a slack list 0800 shown in FIG. 8.

Start Point: names of a flip-flop and a terminal at the starting point of path
End Point: names of a flip-flop and a terminal at the end point of path
Through Point: names of a cell and a terminal midway through a route for uniquely specifying path
Value: slack of path As shown in FIG. 9A, the case where there are a path from a flip-flop 0900 to a flip-flop 0901 and a path from a flip-flop 0901 to a flip-flop 0902 will be explained. Since all the flip-flops 0900, 0901 and 0902 are flip-flops operating at the rising edge of the clock signal (CK) 0903 (see FIG. 9B), an amount of IR drop 904 is at a maximum at the rising edge of the clock signal CK as shown in FIG. 9B.

Figure 10A:
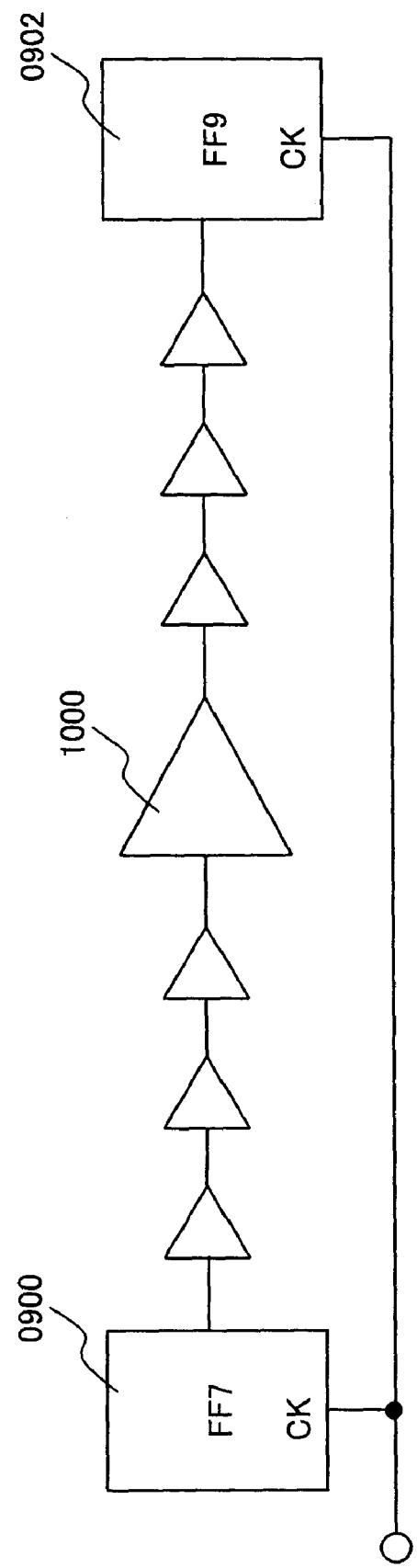
FIG. 10A is a circuit diagram showing a configuration of a circuit after executing a FF substitution procedure S0801 shown in FIG. 8.
Figure 10B:
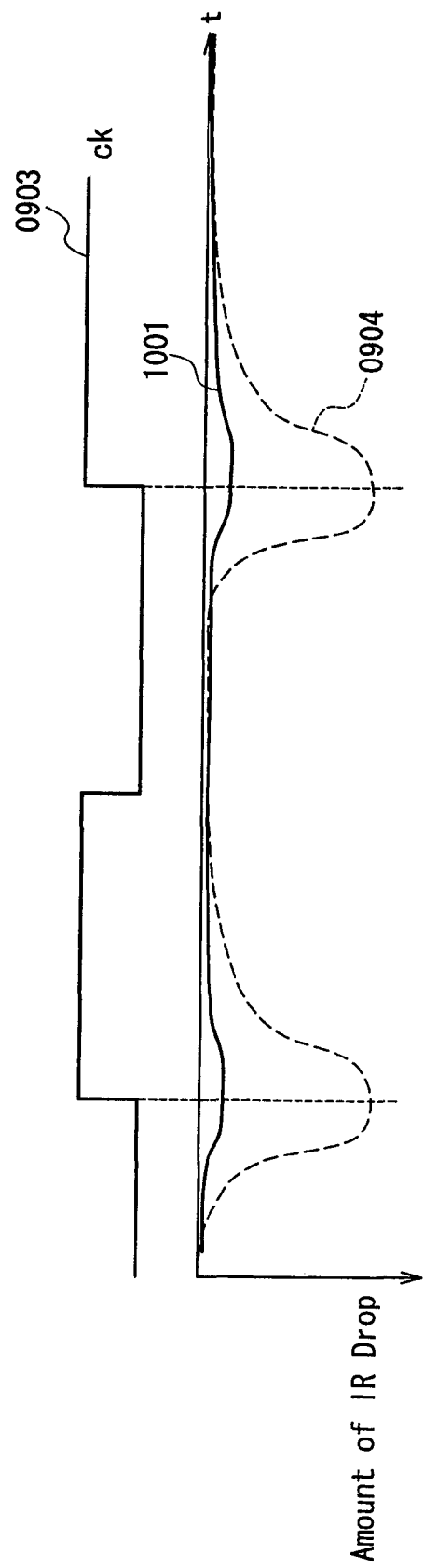
FIG. 10B is a graph showing an amount of IR drop with respect to a clock signal CK in the configuration of the circuit shown in FIG. 10A.
Figure 11A:
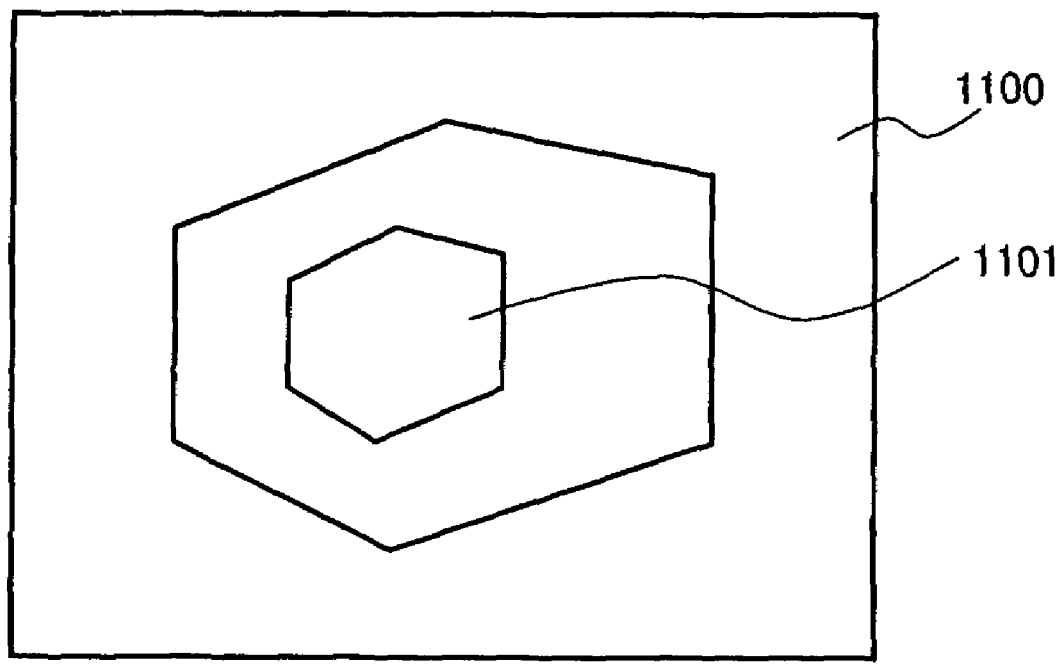
FIG. 11A is an equi-voltage view schematically showing a distribution of an amount of IR drop in a conventional example.
Figure 11B:
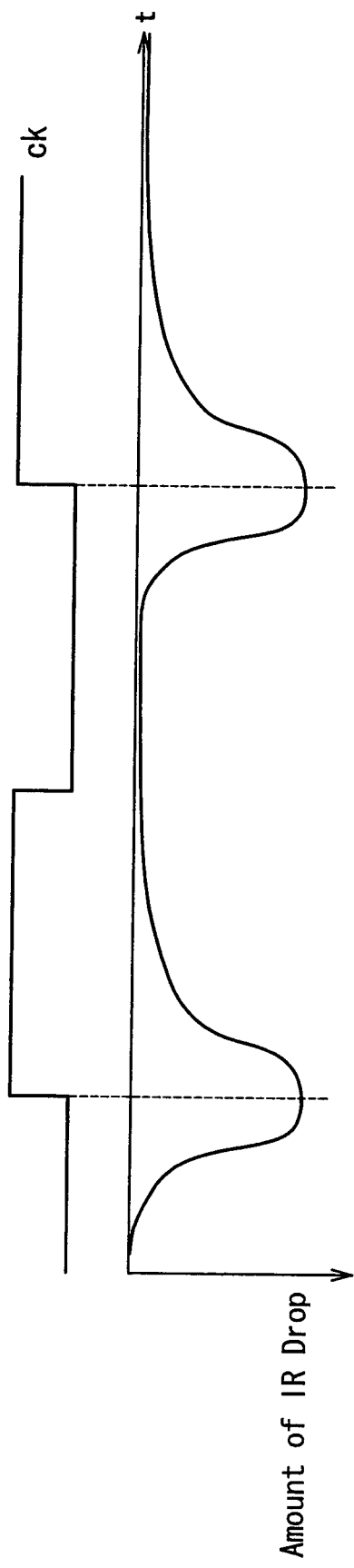
FIG. 11B is a graph showing an amount of IR drop with respect to a clock signal CK in a conventional example.
Figure 12A:
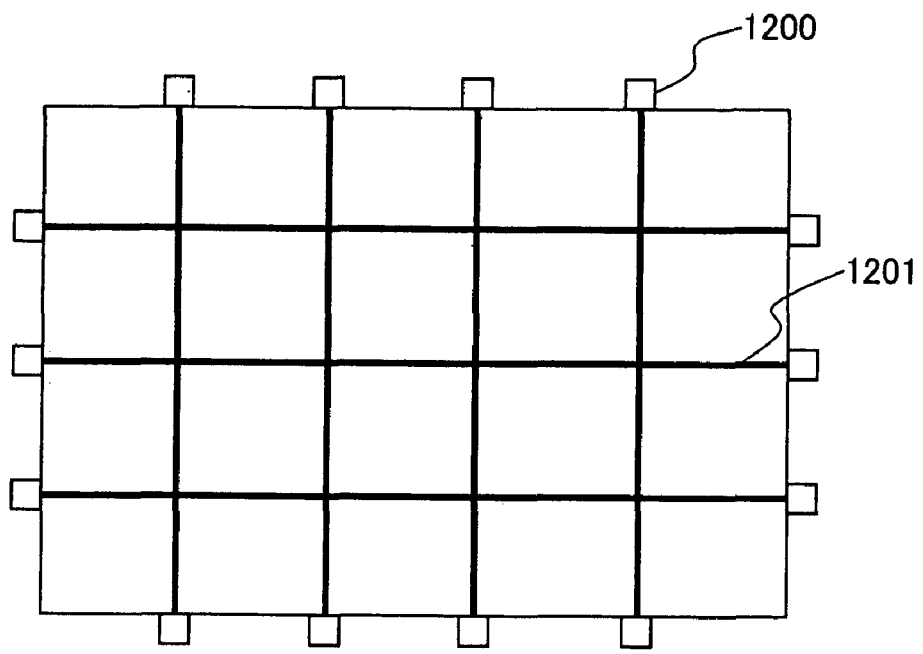
FIG. 12A is a plan view showing an example of a conventional method for laying out a power supply wiring.
Figure 12B:
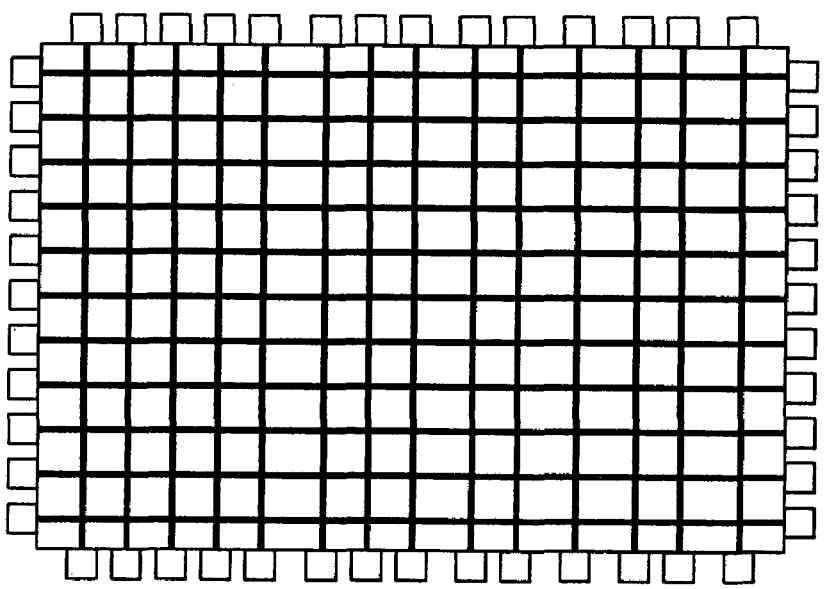
FIG. 12B is a plan view showing another example of a conventional method for laying out a power supply wiring.
Figure 13:
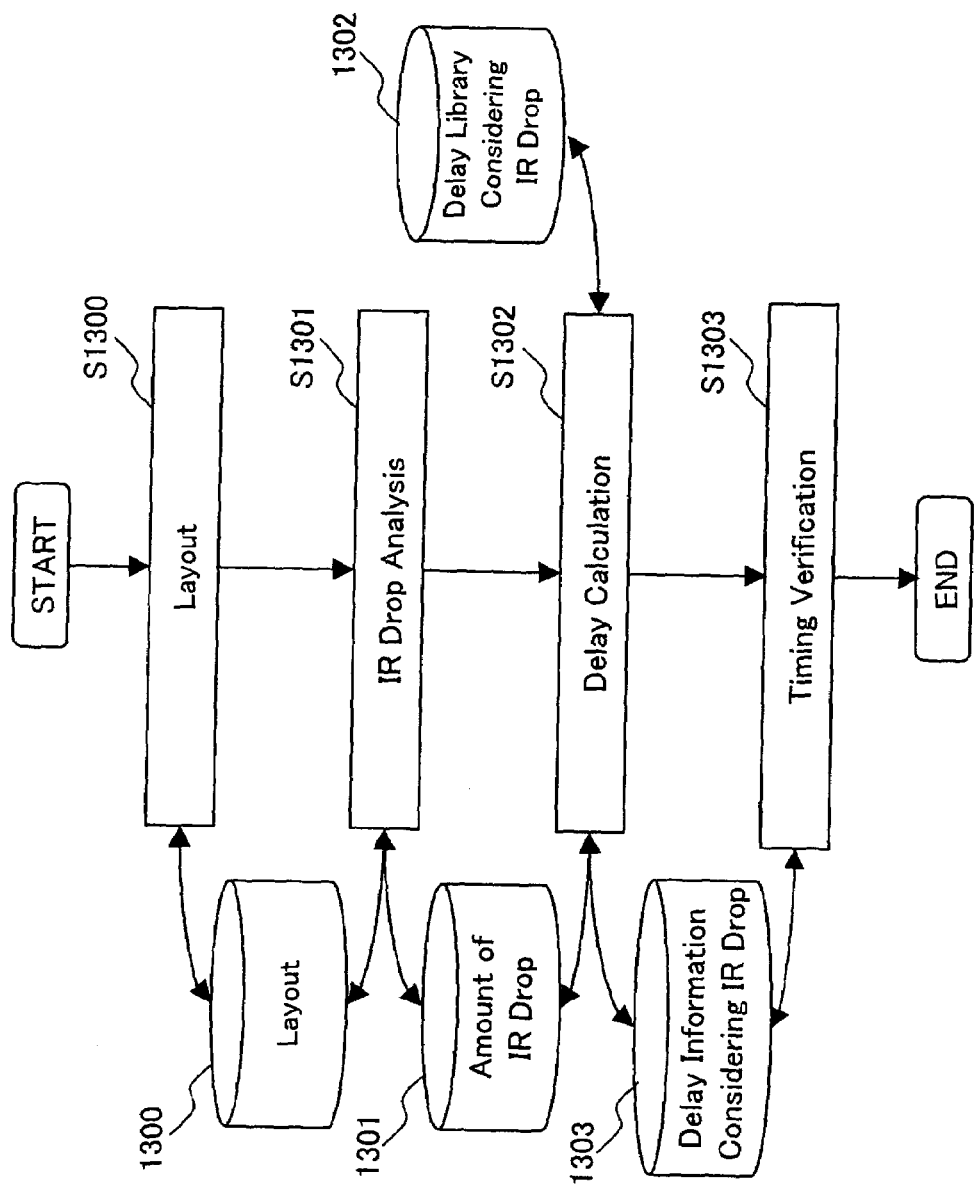
FIG. 13 is a flowchart showing a process procedure in a conventional designing method considering IR drop.
Figure 14:
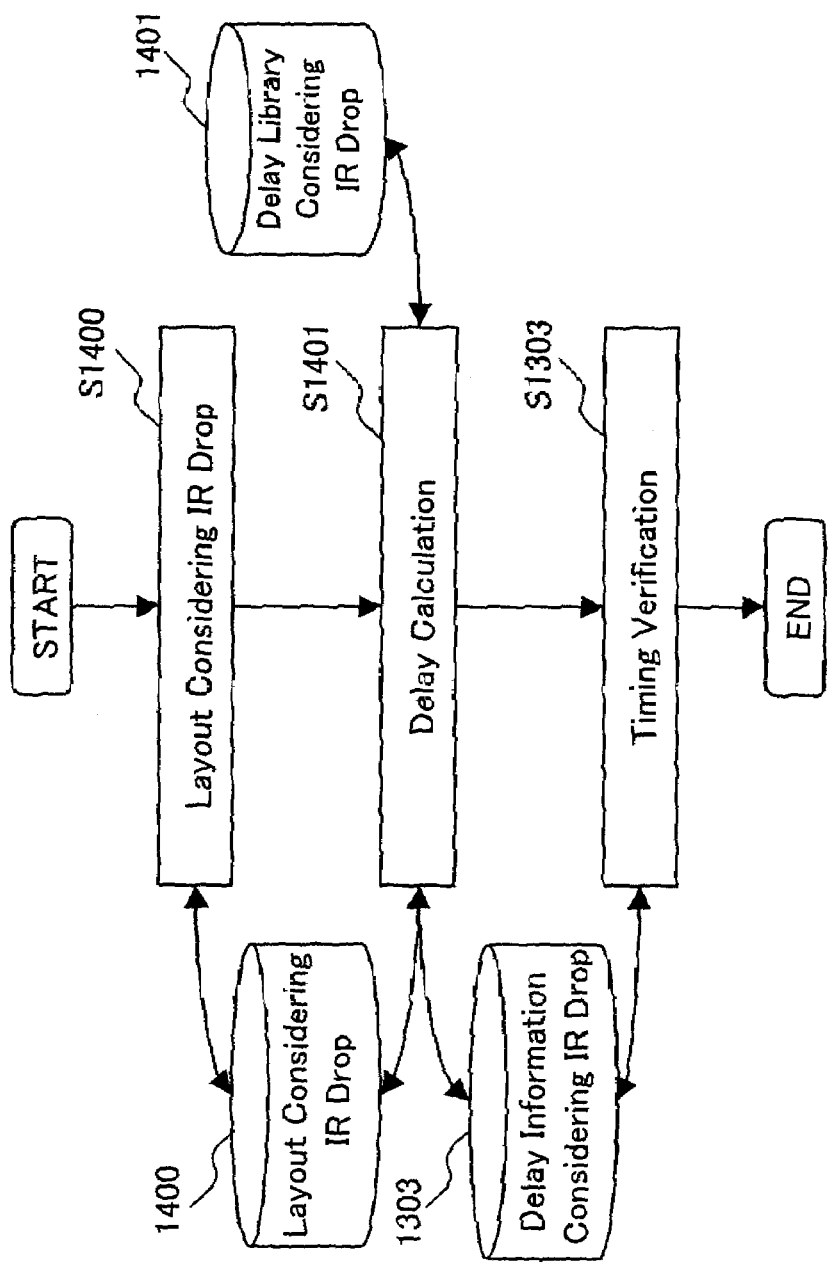
FIG. 14 is a flow chart showing a process procedure in another conventional designing method considering IR drop.

Next, in the FF substitution procedure S0801, paths are extracted in the order of a path whose slack is approximate to zero, and a buffer 1000 shown in FIG. 10A is substituted for the flip-flop 0901 located at the end point of the path. At this time, the delay time of the buffer 1000 is calculated by the following equation (2):

$$\text{Delay time of buffer } 1000 = (\text{set-up time of flip-flop } 0901) + (\text{slack}) + (\text{delay time of flip-flop } 0901) \quad (2)$$

The substitution is performed in order of a path whose slack is approximate to zero. However, when the slack becomes larger, the delay time of the buffer 1000 is increased based on the equation (2), so that it is impossible to perform substitution for all the flip-flops. Therefore, by previously measuring the maximum value of the delay time of the buffer 1000 that is substituted, the substitution is performed for flip-flops at the end point of the paths whose slacks by which the above-mentioned equation (2) is satisfied.

In the FF substitution procedure S0801, since there are no flip-flops, the usual timing verification cannot be performed. Therefore, for the path from the flip-flop 0900 to the flip-flop 0902, a timing restriction for checking whether data are propagated from the flip-flop 0900 to the flip-flop 0902 within two cycles of the clock signal CK is added and output as an additional timing restriction 0802.

Next, in the layout modification procedure S0103, the layout is modified in accordance with the netlist modification file 0801 and output as the layout 0103.

Next, in the delay calculation procedure S0104, resistance and capacitance components are extracted from the modified layout, followed by performing the delay calculation, and the delay information 0106 is output.

Finally, in the second timing verification procedure S0105, it is confirmed whether or not a new timing error occurs due to the substitution for flip-flops.

As mentioned above, according to this embodiment, by substituting the buffer for the flip-flops in order of the path whose slack is approximate to zero, the number of flip-flops operating in synchronization with the clock signal is reduced, thus reducing an amount of IR drop. When the amount of IR drop is reduced, even in the result of the delay calculation using the ideal power supply delay library, the difference from an actual operation is reduced, thus enabling a simulation of an actual operation.

Furthermore, since flip-flops are reduced, clock wirings connected to the flip-flops are not required, thus the area of the clock wirings can be reduced. Furthermore, the area of a buffer is smaller than that of a flip-flop because the number of transistors constituting the buffer is smaller, thus enabling the area of the entire circuit to be reduced.

As mentioned above, according to the present invention, it is possible to provide a method for designing a semiconductor integrated circuit of reducing the effect of IR drop on the timing or an amount itself of IR drop, and enabling a timing simulation that is closer to an actual operation, and having a high resistance to IR drop without reducing an effective area necessary for the arrangement of elements and the number of pads that can be used other than the power supply pads and without increasing the processing time.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for designing a semiconductor integrated circuit comprising basic elements and wirings connecting the basic elements, the method comprising:
   a first timing verification procedure for verifying the timing between flip-flops by adding delay times of the basic elements and the wirings;
   a slack sort procedure for extracting flip-flops at the starting point and the end point of a path, a delay time and a set-up time of cells constituting the path, and a slack with respect to a cycle time from a timing report output by the first timing verification procedure;
   a flip-flop driving ability change procedure for substituting a flip-flop having a delay time larger than a transition time from a state in which a power supply voltage drops due to a resistance component of a power supply wiring to a state of an ideal power supply for an arbitrary flip-flop;

a layout modification procedure for allowing a netlist modified by the substitution to be reflected on the layout;

a delay calculation procedure for calculating a delay from a delay library of only the flip-flops taking a voltage drop into consideration and a delay library produced in a state of an ideal power supply voltage; and a second timing verification procedure for verifying a timing using delay information output from the delay calculation procedure.

2. A method for designing a semiconductor integrated circuit comprising basic elements and wirings connecting between the basic elements, the method comprising:

a first timing verification procedure for verifying the timing between flip-flops by adding delay times of the basic elements and the wirings;

a slack sort procedure for extracting flip-flops at the starting point and the end point of a path, and a slack with respect to a cycle time of the path from a timing report output by the first timing verification procedure;

a positive/negative flip-flop change procedure for substituting a flip-flop operating at the trailing edge of the clock signal for a flip-flop operating at the rising edge of the clock signal at the end point of the path whose slack is larger than ½ of the cycle time so as to make more uniform an amount of a voltage drop at the power supply voltage due to a resistance component of the power supply wiring;

a layout modification procedure for allowing a netlist modified by the substitution to be reflected on the layout;

a delay calculation procedure for calculating a delay from a delay library corresponding to the more uniform amount of the voltage drop; and a second timing verification procedure for verifying a timing using delay information output from the delay calculation procedure.

3. A method for designing a semiconductor integrated circuit comprising basic elements and wirings connecting between the basic elements, the method comprising:

a first timing verification procedure for verifying the timing between flip-flops by adding delay times of the basic elements and the wirings;

a slack sort procedure for extracting flip-flops at the starting point and the end point of a path and a slack with respect to a cycle time of the path from a timing report output by the first timing verification procedure;

a flip-flop substitution procedure for substituting a buffer having a delay time that is the same as the total time of a set-up time, a delay time of a flip-flop and the slack for the flip-flop at the end of the path whose slack is approximate to zero;

a layout modification procedure for allowing a netlist modified by the substitution to be reflected on the layout;

a delay calculation procedure for calculating a delay from a delay library produced in a state of an ideal power supply voltage; and a second timing verification procedure for verifying the timing using delay information output from the delay calculation procedure.

\* \* \* \* \*